3,730,906
CRUDE OIL DEMULSIFIERS
Knut Oppenlaender, Ludwigshafen, Gert Liebold, Mannheim, and Egon Buettner, Ludwigshafen, Germany, assignors to Badische Anilin- & Soda-Fabrik Aktiengesellschaft, Ludwigshafen (Rhine), Germany
No Drawing. Filed Mar. 15, 1971, Ser. No. 124,574
Claims priority, application Germany, Mar. 23, 1970,
P 20 13 823.2
Int. Cl. B01d *17/04*
U.S. Cl. 252—342                    7 Claims

ABSTRACT OF THE DISCLOSURE

Crude oil demulsifiers based on esterification products of rosin with oxyalkylated alkylphenol/formaldehyde resins and their use for breaking crude oil emulsions at ambient temperatures.

---

This invention relates to the use of polyoxyalkylated compounds for breaking water-in-oil emulsions at ambient temperatures. The invention further relates to a process for breaking water-in-oil emulsions at ambient temperatures.

Polyoxyalkylated compounds such as block copolymers of ethylene oxide and 1,2-propylene oxide are known, for example from U.S. Pat. 2,964,478. They are recommended for use as demulsifiers for oil-in-water emulsions containing predominantly water, but they are not suitable for resolving emulsions of inverse constituent proportions, that is, of water-in-oil emulsions containing predominantly oil. The resolution of the latter types of emulsion is, however, a particularly important problem in the mineral oil industry and a number of solutions thereto are known, but these solutions do not meet all requirements.

The known demulsifiers for water-in-oil emulsions, as disclosed for example in German published application DOS 1,545,250 and largely consisting of a variety of alkylene oxide polymers and compounds derived therefrom, all having hydrophilic end groups, are frequently too slow in action and usually act only at elevated temperatures. They leave unduly large concentrations of residual water and residual salt or even residual emulsion or they give satisfactory results only with very special types of oil.

Usually, the tapped water-in-oil emulsions must be heated to temperatures above 40° C. and sometimes to as high as 80° C. depending on their viscosity, in order to achieve the desired low contents of water, salt and, in some cases, residual emulsion by a chemical or combined chemical and electrical process. Such heating involves comparatively high energy consumption and it is thus desirable to find a way of breaking water-in-oil emulsions at the temperatures at which they are tapped, for example at from about 10° to 40° C. by adding suitable splitters without applying heat.

It is an object of the invention to provide universally applicable demulsifiers which do not have the aforementioned drawbacks and may be used for breaking emulsions at ambient temperatures without the application of heat.

It is a further object of the invention to provide a process for breaking crude oil emulsions at ambient temperatures using the said agents.

These objects are achieved by esterification products of rosin, that is, of the abietic acid contained therein in a concentration of about 96%, or of mono-, di- or tri-esters of maleopimaric acid with polyoxyethylation and/or polyoxypropylation products of isoalkylphenol/formaldehyde resins containing from 3 to 30 phenol units each carrying an oxyalkylate group which consists of from 4 to 50 alkylene oxide units, and an alkyl radical of from 8 to 12 carbon atoms attached to the benzene nucleus in the p-position to the oxyalkylate group.

Suitable starting materials for the production of the products of the invention are rosin, that is, the abietic acid contained therein in a concentration of about 96%, or maleopimaric acid.

Rosin is a natural product and may be used without further processing. Alternatively, pure abietic acid, which is classified as a terpene and constitutes a triterpene, may be isolated from rosin, for example by distillation, and then used as starting material.

Maleopimaric acid may be obtained in known manner from abietic acid or rosin by the Diels-Alder addition of maleic anhydride. It constitutes a particularly advantageous starting material because it is trifunctional, that is, it contains three esterifiable carboxyl groups. The addition may be readily carried out by the methods usually adopted for such reactions, for example by heating a mixture of the starting materials present in equivalent amounts at about 200° C. for several hours.

Suitable alcoholic esterification components are iso-alkylphenol/formaldehyde resin polyoxyethylates and/or the corresponding polyoxypropylates. They contain from 3 to 30 and preferably from 4 to 20 phenol units, each of which carries from 4 to 50 and preferably from 15 to 30 alkylene oxide units. Particularly advantageous are iso-alkylphenol/formaldehyde resins oxyethylated from 15 to 30 times.

Each phenol nucleus of the resins carries an isoalkyl radical of from 8 to 12 carbon atoms in the p-position to the oxyalkylate group. Preferred radicals are the iso-octyl, isononyl and isododecyl radicals.

Thus preferred resins for the esterification are iso-octyl-, isononyl- and isododecyl-phenol/formaldehyde resins oxyalkylated with from 15 to 30 ethylene oxide units per phenol nucleus and containing from 3 to 20 phenol nuclei in the molecule.

The oxyalkylated phenol resins are prepared by conventional techniques.

They are obtained by dissolving isoalkylphenol in an aromatic hydrocarbon such as toluene, xylene or tetra-hydronaphthalene or in an appropriate aliphatic compound, that is, an aliphatic compound which boils at from about 100° to about 220° C., such as kerosine, adding an aqueous formaldehyde solution and completing the condensation in an acid medium, for example containing hydrochloric acid, or in a basic medium, optionally in the presence of a wetting agent such as an alkylaryl sulfonate, at elevated temperature. The phenol resins obtained by acid condensation are known as novolaks and those obtained by alkaline condensation are referred to as resols.

Solvents not donating protons under the conditions of the reaction are enclosed, to a certain extent, by the condensation products and remain in the products after condensation.

The resulting condensation products are then reacted with ethylene oxide and/or propylene oxide under pressures ranging from 2.5 to 7 atmospheres gage and preferably from 3 to 6 atmospheres gage to form the polyoxyalkylates. Oxyalkylation may, if desired, be carried out in a number of alternating steps. For example, the first step may involve oxyethylation, the second oxypropylation and a third step may again involve oxyethylation.

The esterification products of abietic acid or maleopimaric acid with the oxyalkylated phenol resins may be carried out in the following manner: a polyoxyalkylated phenol resin of the kind defined above is esterified directly with rosin or maleopimaric acid in a molar ratio of 1:1 or, in the case of maleopimaric acid, from 1:1 to 1:3 in an acid medium, for example a medium containing sulfuric acid, phosphoric acid, p-toluene sulfonic acid or boric acid.

The individual products, esters or resin condensates are characterized by certain values such as saponification values, acid values and hydroxyl values, etc. The products are usually brittle substances of a light brown to medium brown color, though they sometimes have a dark brown color.

The products may be used in substance for breaking water-in-oil emulsions at ambient temperatures. However, it is preferred to use them in the form of solutions. Suitable solvents are, above all, cycloaliphatic or aromatic hydrocarbons such as ethyl cyclohexanol, toluene or xylene. The solutions are conveniently adjusted to a solids content of from 0.5 to 50% by weight.

They are characterized by their viscosity, as is also possible with some of the intermediates such as the alkylphenol/formaldehyde resins.

For the purpose of breaking water-in-oil emulsions the products of the invention are added either in substance or in solution to the petroleum emulsions, preferably at the oil well. The reaction takes place at the temperature of the freshly tapped water-in-oil emulsion at such a rate that the emulsion may break up on its way to the processing plant. Here it is readily separated into crude oil (dry oil) and salt water in an appropriate, unheated separator in which an electric field may be used if necessary. In difficult cases, a small portion of the salt water remains in the crude oil in the said separators. This necessitates further treatment in chemical or combined chemical and electrical plant (treaters) at elevated temperatures, but there is now the significant advantage that the major portion of the water has already been removed and thus no longer needs to be heated. Water (1 cal. g.$^{-1}$ °C.$^{-1}$) has about twice the specific heat of petroleum (0.5 cal. g.$^{-1}$ C.$^{-1}$).

The products to be used in accordance with the present invention are valuable for separating salt water from crude oil from a wide variety of sources. They are added to the emulsions advantageously in proportions ranging from 0.00001 to 0.01% and preferably from 0.0005 to 0.005% by weight of the emulsion to be separated, at temperatures ranging from 10° to 40° C.

The agents may be used for separating water-in-oil emulsion containing from about 0.1 to 90% by weight of salt water. Suitable oils which may be dehydrated cold in this manner are those having pour points which are at least 10° C. below the temperature at which they are tapped. Examples are the oils tapped in Hankensbüttel, Berkhöpen, Steimke, Stelle (Lower Saxony), Landau (Upper Rhine Valley), Arlesried (Alpine Foreland), Parentis, Mimizan (South West France) and Bahrein (Middle East). In addition, the novel agents may be used for numerous crude oils found in South America, Central America and certain parts of USSR. The separation of the water-in-oil emulsion takes place extremely rapidly and virtually quantitatively without the application of heat. Treaters need only be used in exceptional cases.

In the following examples the parts and percentages are by weight unless otherwise stated.

EXAMPLE 1

Preparation of maleopimaric acid 453 parts (1.5 equivalents) of rosin are melted under a nitrogen blanket at 160° C. and dried at 20 mm. of Hg for 4 hours. 147 parts (1.5 equivalents) of maleic anhydride powder are then added at 180° to 190° C. and the mixture is heated at 200° C. for 5 hours. The yield is 600 parts and the acid value is 280.

EXAMPLE 2

Preparation of polyoxyalkylated alkylphenol/formaldehyde resins (a) Condensation.—1,030 parts (5 equivalents) of iso-octylphenol are dissolved in 0.7 part by volume of xylene at 40° C. and 500 parts (approximately 5 equivalents) of 30% aqueous formaldehyde solution are then added over 90 minutes. After the addition of 0.04 part by volume (0.4 equivalent) of concentrated hydrochloric acid and 3 parts of a pulverized alkylaryl sulfonate, for example dodecylbenzene sulfonate, the mixture is heated at the boil under reflux for 5 hours and after 7 hours 470 parts of hydrochloric acid-containing water are separated, the temperature being raised to 150° C. The yield is 1,870 parts, the acid value is 53 and the hydroxyl value is 302 (180 to 320 according to the degree of condensation), the viscosity ($\eta$) is 84.5 cp. (measured in 50% solution in xylene with a falling ball viscosimeter by Höppler).

(b) Oxyethylation.—127 parts (75 parts of pure substance) of iso-octylphenol/formaldehyde resin is xylene are placed in a stirred autoclave together with 0.65 part of caustic soda (0.5% by weight based on the resin) and reacted with 70 parts of ethylene oxide fed portionwise over from 3 to 5 hours at a pressure of from 2.5 to 7 atmospheres gage. There are thus obtained 195 parts (theory demands 197 parts) of a medium brown viscous product in the form of a 74% solution in xylene. The acid value of the pure product is zero and its hydroxyl value is from 120 to 135. Its viscosity ($\eta$) is 16.5 cp. (measured in 50% solution in xylene).

Examples 3 to 5 describe the preparation of demulsifiers.

EXAMPLE 3

260.5 parts (0.1 equivalent) of polyoxyethylated iso-octylphenol/formaldehyde resin containing from about 20 to 24 ethylene oxide units per phenol nucleus and having an average molecular weight of from 600 to 800 are mixed with 2.605 parts (1% by weight) of p-toluene sulfonic acid and 40 parts (0.1 equivalent) of maleopimaric acid, and the mixture is stirred at 150° C. under a blanket of nitrogen for 3 hours and then dried at 120° C. and 20 mm. of Hg for 3 hours. The reaction product is obtained in a yield of 300 parts and has an acid value of 4.5, a saponification value of 10 and a hydroxyl value of 124.0.

EXAMPLE 4

260 parts of the polyoxyethylated iso-octylphenol/formaldehyde resin used in Example 3, 2.65 parts (1% by weight) of p-toluene sulfonic acid and 20 parts (0.05 equivalent) of maleopimaric acid are mixed together and stirred at 150° C. under a blanket of nitrogen for 3 hours and then dried at 120° C. and 20 mm. of Hg for 3 hours. The yield is 280 parts, the acid value being 2.2, the saponification value being 6 and the hydroxyl value being 144.0.

EXAMPLE 5

156.5 parts (0.06 equivalent) of the oxyalkylated phenol/formaldehyde resin used in Example 3, 1.56 parts (1% by weight) of p-toluene sulfonic acid and 8 parts (0.02 equivalent) of maleopimaric acid are mixed together and stirred at 150° C. under a blanket of nitrogen for 3 hours and then dried at 120° C. and 20 mm. of Hg for 3 hours. The yield is 163 parts, the acid value being 1.3, the saponification value being 2.5 and the hydroxyl value being 133.

The following Examples 6 and 7 describe the use of the products of the invention for emulsion breaking purposes.

EXAMPLE 6

100 parts of a crude oil emulsion having $p$ parts by volume of water were vigorously stirred, at 20° C., with $q$ parts of the products of the invention or, by way of comparison, with conventional splitters based on alkylene oxide, whereupon the mixture was left to stand. The amount of separated water was measured after 10, 20, 40, 60 and 120 minutes. The times $t_1$ and $t_2$ were recorded, $t_1$ indicating the time at which 80% of the water had separated, whilst $t_2$ indicates the time at which the oil and water had completely separated from each other, apart from the residual water content in the oil.

For example, the following results could be obtained for the oil tapped in Stelle (Lower Saxony). In the case of a water content of 32 ml. in 100 g. of crude oil emulsion, 4 mg. of an ester of rosin with polyoxyethylated phenol/formaldehyde resin were required to separate 80% of the total water in 60 minutes. After 150 minutes analysis showed that the water content was only 0.2%.

EXAMPLE 7

In an oil field in South Germany which taps a crude oil emulsion containing, on average, 28% of water, 15 p.p.m. of a conventional ethylene oxide demulsifier are continuously added to the emulsion at the well. The crude oil emulsion is then heated to 80° C. in a thermal treater forming part of the processing plant. The emulsion is then passed to a settling tank, where the oil and salt water separate until the oil has a residual water content of 0.4%. When the polyalkylene oxide metered to the emulsion was replaced by one of the compounds of the invention, separation of the salt water to a residual content of 0.3% took place at the temperature of the tapped oil (40° C.) and the temperature at the processing plant (25° C.), that is, without heating to 80° C. as before. Thus the thermal treater could be put out of operation.

Transportable oil was thus obtained in a simple manner by operating at ambient temperature.

We claim:

1. An ester useful as a crude oil demulsifier, said ester being a mono-, di-, or tri-ester of maleopimaric acid and a polyoxyalkylated isoalkylphenol-formaldehyde resin, said resin having 3–30 isoalkylphenol units per molecule, each unit bearing an oxylalkylate group respectively composed of 4–50 alkylene oxide units of ethylene oxide, propylene oxide, or both ethylene oxide and propylene oxide, and the isoalkyl group of said isoalkylphenol having 8–12 carbon atoms in p-position to the respective oxyalkylate groups on respective benzene nuclei of said isoalkylphenol.

2. An ester as claimed in claim 1, wherein said resin has 4–20 isoalkylphenol units per molecule.

3. An ester as claimed in claim 1 wherein the respective oxyalkylate groups are composed of 15 to 30 of said alkylene oxide units.

4. An ester as claimed in claim 3 wherein said alkylene oxide units are ethylene oxide units.

5. An ester as claimed in claim 1 wherein the isoalkyl group of said isoalkylphenol is selected from the group consisting of isooctyl, isononyl and isododecyl.

6. A process for breaking water-in-crude oil emulsions which comprises adding thereto an ester as claimed in claim 1 in proportions ranging from 0.0001 to 0.01% by weight of the weight of the water-in-crude oil emulsion, and resolving the broken emulsion into its respective water and crude oil phases at a temperature in the range of 10 to 40° C.

7. A process as claimed in claim 6 wherein said proportions are in the range of 0.0005 to 0.005% by weight.

References Cited

UNITED STATES PATENTS 2,581,377  1/1952  De Groote _____ 252—342

JOHN D. WELSH, Primary Examiner

U.S. Cl. X.R.

260—53 EP